(12) United States Patent
Nakamura et al.

(10) Patent No.: US 8,246,020 B2
(45) Date of Patent: Aug. 21, 2012

(54) DAMPING DEVICE

(75) Inventors: Shinya Nakamura, Hiratsuka (JP);
Toshio Yamashita, Hiratsuka (JP);
Shinji Mitsuta, Hiratsuka (JP);
Masatake Tamaru, Fujisawa (JP);
Hiroyuki Itoh, Yokohama (JP)

(73) Assignee: Komatsu Ltd., Tokyo (JP)

( * ) Notice: Subject to any disclaimer, the term of this patent is extended or adjusted under 35 U.S.C. 154(b) by 410 days.

(21) Appl. No.: 12/532,513

(22) PCT Filed: Mar. 13, 2008

(86) PCT No.: PCT/JP2008/054569
§ 371 (c)(1),
(2), (4) Date: Sep. 22, 2009

(87) PCT Pub. No.: WO2008/117669
PCT Pub. Date: Oct. 2, 2008

(65) Prior Publication Data
US 2010/0117275 A1 May 13, 2010

(30) Foreign Application Priority Data
Mar. 23, 2007 (JP) ................................ 2007-077947

(51) Int. Cl.
*E02F 9/16* (2006.01)
(52) U.S. Cl. ................. 267/131; 297/463.1; 297/344.16
(58) Field of Classification Search .................. 297/208, 297/344.16, 463.1; 248/562, 565, 429; 267/33, 267/34, 35, 131, 133, 195, 248, 288, 257
See application file for complete search history.

(56) References Cited

U.S. PATENT DOCUMENTS
2005/0082897 A1 * 4/2005 Ropp et al. ................ 297/463.1

FOREIGN PATENT DOCUMENTS
| JP | 7-113248 A | 5/1995 |
| JP | 9-209406 | 8/1997 |
| JP | 11-140909 A | 5/1999 |
| JP | 11-217849 | 8/1999 |
| JP | 2000-319937 A | 11/2000 |

OTHER PUBLICATIONS

International Preliminary Report on Patentability and Written Opinion (in English), made available in the WIPO database on Jan. 13, 2010, in the image file of counterpart International Application No. PCT/JP2008/054569.
English Language International Search Report dated May 13, 2008 issued in parent Appln. No. PCT/JP2008/054569.

* cited by examiner

*Primary Examiner* — Christopher Schwartz
(74) *Attorney, Agent, or Firm* — Holtz, Holtz, Goodman & Chick, PC

(57) ABSTRACT

A vibration isolator includes layered rubbers interposed between a support body and a movable body, and a pair of dampers attached to the support body at one ends and to the movable body at the other ends. The layered rubbers are arranged to be spaced apart in an anterior and posterior direction and in a left and right direction, with reference to a direction in which an operator faces when seated. One of the dampers is arranged at a position corresponding to a middle of the left and right direction between the layered rubbers arranged in the left and right direction, and aligned in the anterior and posterior direction. The other one of the dampers is arranged closer to an anterior side than a middle of the anterior and posterior direction between the layered rubbers arranged in the anterior and posterior direction, and aligned in the lift and right direction.

6 Claims, 7 Drawing Sheets

DAMPING DEVICE

This application is a U.S. National Phase Application under 35 USC 371 of International Application PCT/JP2008/054569 filed Mar. 13, 2008.

TECHNICAL FIELD

The present invention relates to a vibration isolator.

BACKGROUND ART

To date, link mechanisms for preventing yaw in cabs (operator's cabins) in construction machines such as hydraulic excavators and bulldozers have been known (for example, see Patent Document 1). Such a link mechanism is structured so that a bottom surface of a cab and a top surface of a frame for supporting the cab are linked together with a horizontal rod having a pillow end, and advantageous in that its structure is considerably simple.

Moreover, by vertically linking the cab and the frame together with elastic bodies such as rubber bushes or coil springs, and by providing a damper for damping any tremor at the time of vibration absorption in the elastic bodies, shock applied on the vehicle frame during various operations such as excavation and transport of earth is reduced, so that an operator can have a more comfortable ride in the cab.

According to another example as disclosed in Patent Document 2, a guide slidable in the anterior, posterior, left and right directions is provided underneath the seat cushion so as to reduce vibration applied to the anterior and posterior, and left and right of an operator, such that the operator can have a more comfortable ride.

Patent Document 1: JP-A-11-140909 (see paragraphs [0055] to [0059] and FIGS. 3, 6 and 7)
Patent Document 2: Specification of US 2005/0082897

DISCLOSURE OF THE INVENTION

Problems to be Solved by the Invention

Depending on the type of construction machines, most shock generated at the time of operation may be applied from the left and right direction at the posterior of the vehicle frame based on the structure of the construction machine. However, in the techniques disclosed in Patent Documents 1 and 2 and also in other techniques to date, there has not been sufficient consideration given to shock applied from the left and right direction at the posterior of the vehicle frame. Accordingly, an operator may not have a sufficiently comfortable ride.

An object of the invention is to provide a vibration isolator capable of reliably absorbing and damping shock in left and right direction generated at the posterior of a vehicle frame and capable of providing a sufficiently comfortable ride for an operator.

Means for Solving the Problems

A vibration isolator according to an aspect of the invention includes: elastic bodies interposed between a support body comprised in a construction machine and a movable body including a seat body for seating an operator; and a pair of dampers attached to the support body at one ends and attached to the movable body at the other ends; in which the elastic bodies are arranged to be spaced apart in an anterior and posterior direction and in a left and right direction, with reference to a direction in which the operator faces when seated, the elastic bodies being movable in the anterior and posterior direction and in the left and right direction, one of the dampers is arranged at a position corresponding to a middle of the left and right direction between the elastic bodies arranged in the left and right direction, the one of the dampers being aligned in the anterior and posterior direction, and the other one of the dampers is arranged only at a position closer to an anterior side than a middle of the anterior and posterior direction between the elastic bodies arranged in the anterior and posterior direction, the other one of the dampers being aligned in the left and right direction.

According to the aspect of the invention, the pair of dampers are arranged in a T-shape, and one of the dampers aligned in the left and right direction is positioned closer to the anterior side than the middle between the anterior and posterior elastic bodies. With such a configuration, since a damping force in the left and right direction applied on the posterior side is reduced and movement at the posterior side is increased as compared to the anterior side, shock absorbability at the posterior side can be enhanced. Thus, shock in the left and right direction applied on the posterior side can be favorably absorbed, so that an increasingly comfortable ride can be provided. On the other hand, the anterior side is applied with a more damping force and the movement at the anterior side is suppressed. Therefore, body movements of an operator are less influential on the forward vision. With the damper positioned at the middle of the left and right direction and aligned in the anterior and posterior direction, the movement in the anterior and posterior direction can be absorbed by the elastic bodies spaced apart in the left and right direction in a balanced manner.

Preferably in the vibration isolator according to the aspect of the invention, the elastic bodies are interposed at at least three locations between the support body and the movable body.

Preferably in the vibration isolator according to the aspect of the invention, the elastic bodies are interposed at at least three locations between the support body and the movable body.

According to the aspect of the invention, since at least three elastic bodies are placed between the support body and movable body while being spaced away from one another in the anterior, posterior, left and right directions, the flatness of the support body and the movable body can be maintained, and vibration in the anterior, posterior, left and right directions can be favorably absorbed. Further, by using four or more elastic bodies, the pitching and rolling movements of the movable body can be effectively suppressed.

Preferably in the vibration isolator according to the aspect of the invention, the elastic bodies are layered rubbers in which rubber materials and metal panels are alternately layered.

According to the aspect of the invention, the movable body is supported by layered rubbers that exhibit high rigidity in the layered direction and excellent elasticity in a direction orthogonal to the layered direction. Thus, with the rigidity in a direction in which the movable body gets close to or away from the support body being maintained, relative movements of the movable body in a sliding direction is allowed. Accordingly, while the movable body can be reliably supported and the relative mobility of the movable body in the sliding direction can be sufficiently secured, shock can be favorably absorbed.

Preferably in the vibration isolator according to the aspect of the invention, the support body includes a cab floor provided to the construction machine, the movable body includes the seat body arranged on the cab floor, and the vibration isolator is arranged between the seat body and the cab floor.

According to the aspect of the invention, the vibration isolator supports weights of the seat cushion, seat suspension and operator. Thus, as compared with a configuration where the vibration isolator supports the entire cab in a vibration isolating manner, the vibration isolator can be downsized.

In addition, when the vibration isolator provided under the seat cushion and over the seat suspension supports an operator in a vibration isolating manner, the vibration isolator exhibits such small support rigidity as to allow the seat cushion to be easily moved depending on operations by the operator, which may lead to impediment to the operations. However, according to the aspect of the invention, where the vibration isolator provides the support under the seat body, the rigidity of the elastic bodies can be so enhanced that the movements of the seat body during operations by an operator can be suppressed. Therefore, impediments to the operations can be prevented.

The vibration isolator according to the aspect of the invention preferably further includes a stopper mechanism that limits a relative movement of the support body and the movable body.

According to the aspect of the invention, since the stopper mechanism limits the movements of the movable body, ride quality is not damaged even when the movable body is unnecessarily moved. In addition, even if the elastic bodies and the dampers should be disengaged from the support body and the movable body, the stopper mechanism can prevents the movable body from being disengaged from the support body. Thus, damages to the other neighboring components can be prevented.

BEST MODE FOR CARRYING OUT THE INVENTION

First Exemplary Embodiment

A first exemplary embodiment of the invention will be described below with reference to the drawings.

Figure 1:
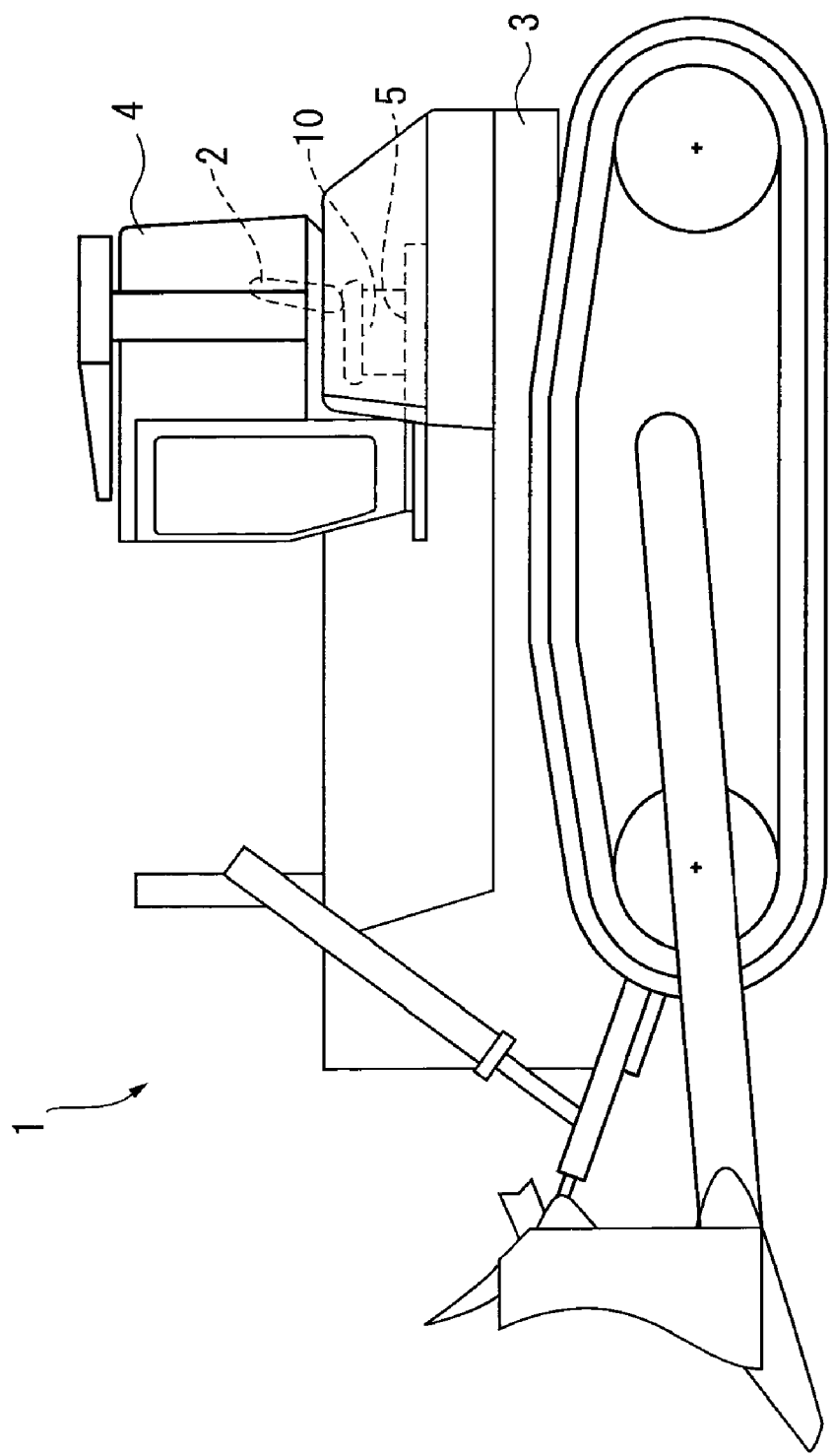
FIG. 1 is a side view that schematically shows a construction machine in which a vibration isolator according to a first exemplary embodiment of the invention has been utilized.
Figure 2:
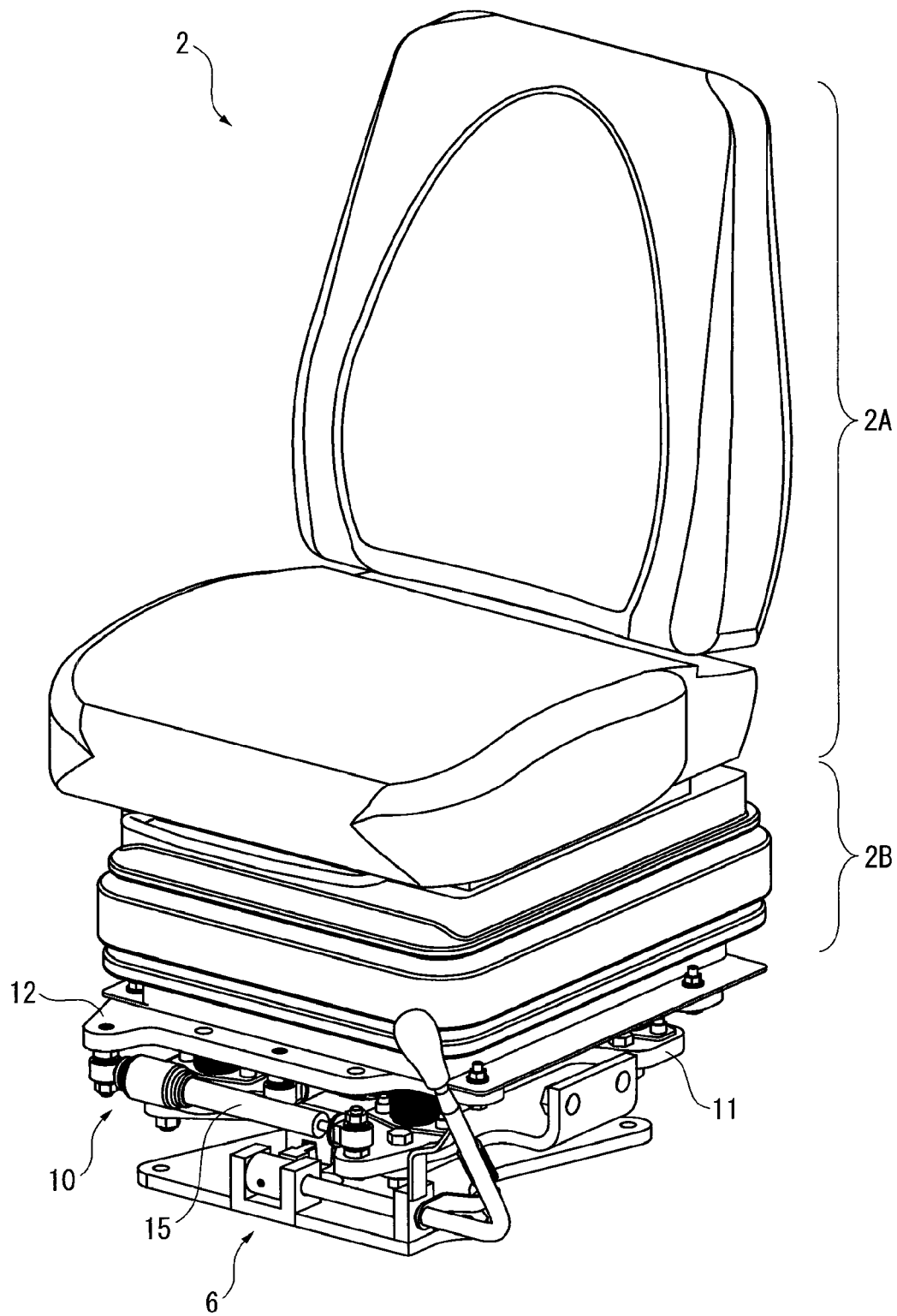
FIG. 2 is a perspective view that shows a seat section to which the vibration isolator is attached.

FIG. 1 is a side view that schematically shows a bulldozer 1 as construction machine in which a vibration isolator 10 according to this exemplary embodiment of the invention has been utilized. FIG. 2 is a perspective view that shows a seat section to which the vibration isolator 10 is attached. The vibration isolator 10 is attached to a bottom surface of a seat body 2 of the bulldozer 1. Specifically, a cab 4 is provided on a main frame 3 of the bulldozer 1, and the vibration isolator 10 is interposed between a cab floor 5 and the seat body 2 in an interior of this cab 4.

More specifically, as shown in FIG. 2, a seat turntable 6 is provided between the vibration isolator 10 and the cab floor 5 (see FIG. 1), and the vibration isolator 10 and the seat body 2 are turnable together within the range of a predetermined angle by operating a lever. Furthermore, the seat body 2, which is located above the vibration isolator 10, includes: a seat cushion 2A provided by a back support and a seat surface for an operator; and a seat suspension 2B covered with a bellows. In this exemplary embodiment, a support body according to the aspect of the invention includes the seat turntable 6 and the cab floor 5, while a movable body according to the aspect of the invention includes the seat cushion 2A and the seat suspension 2B. However, the seat turntable 6 and the seat cushion 2B are of conventionally well-known structures. Accordingly, any further explanation of those structures will be omitted herein, and the vibration isolator 10 will be described in detail below.

Figure 3:
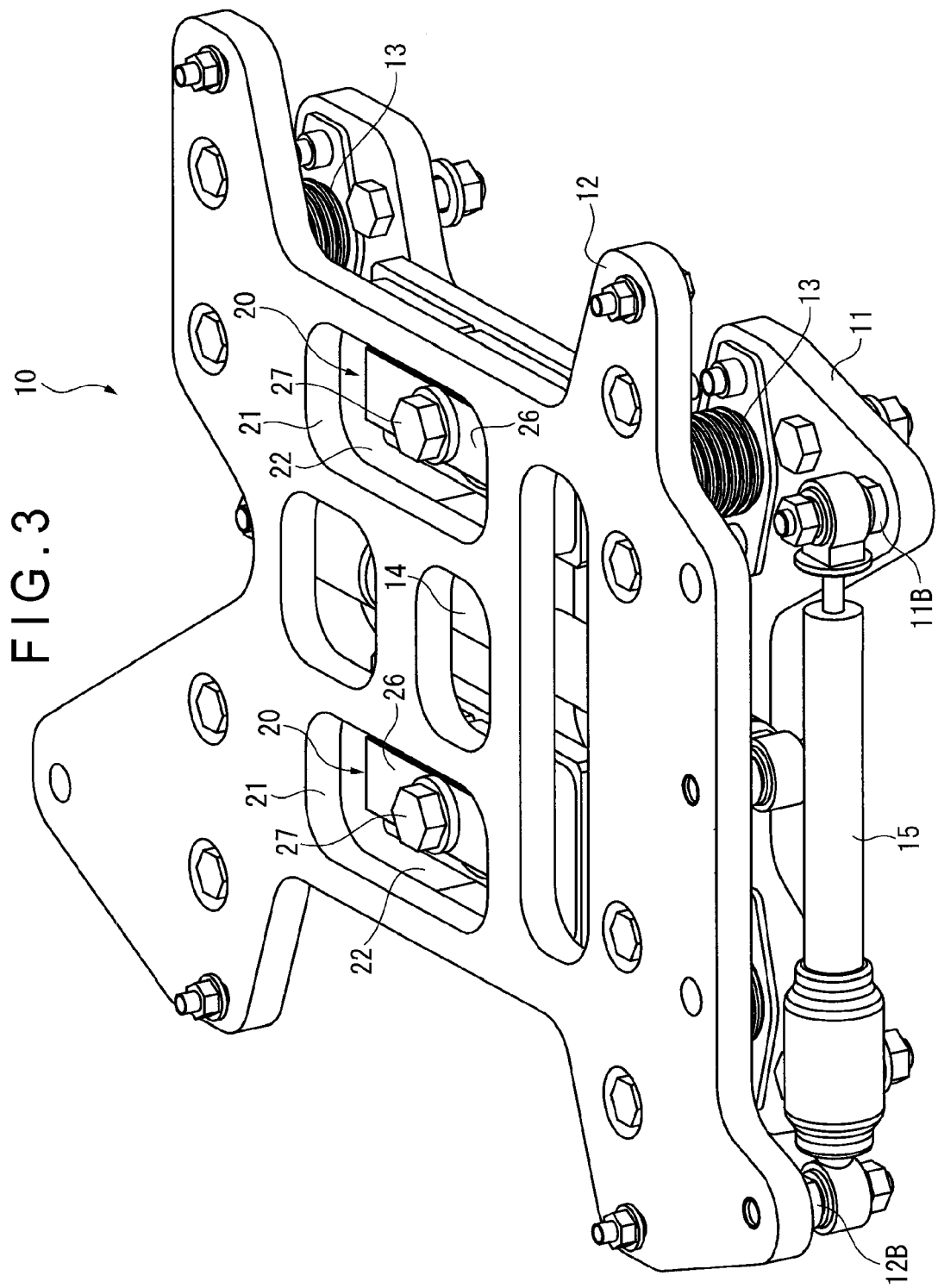
FIG. 3 is an overall perspective view of the vibration isolator.
Figure 4:
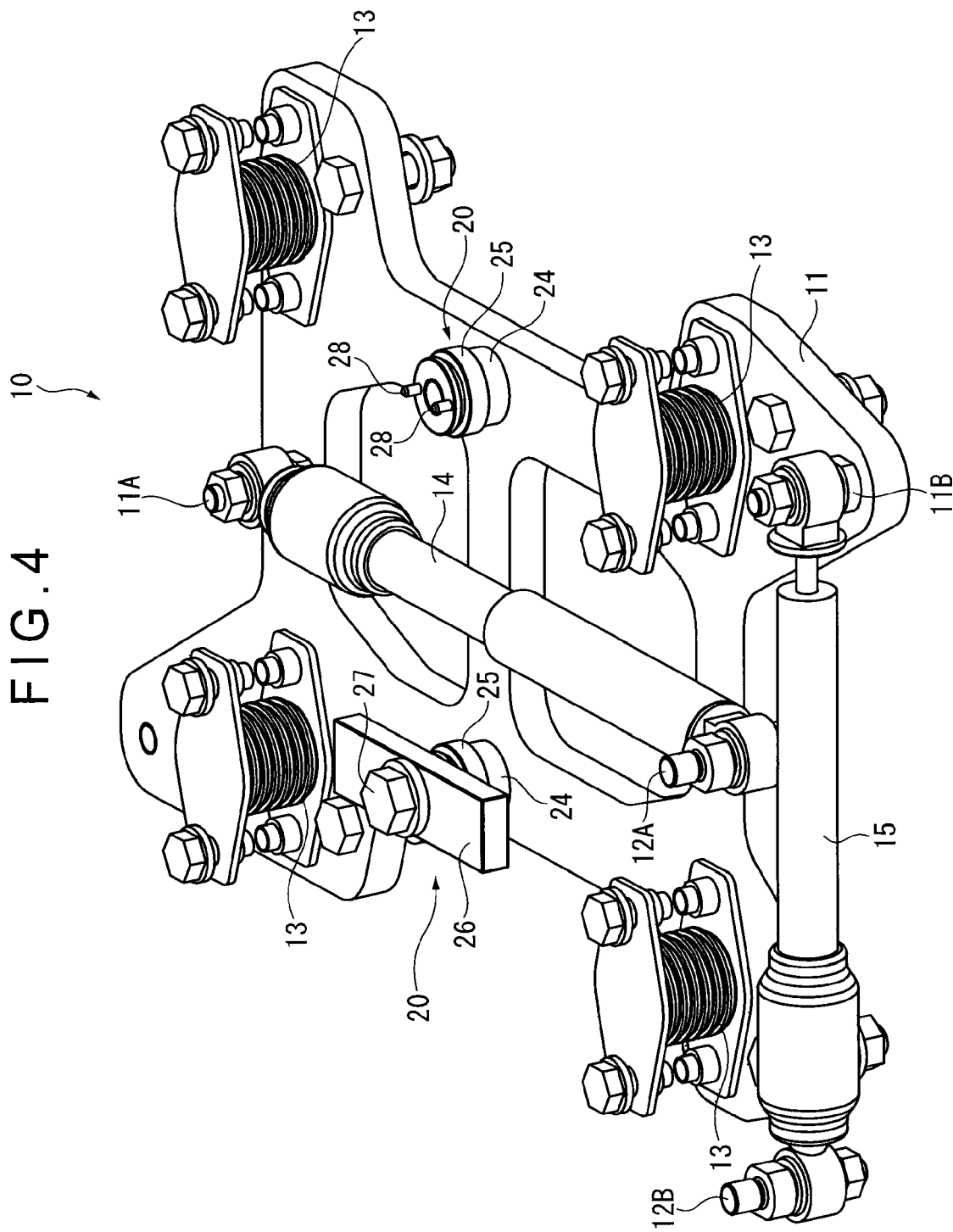
FIG. 4 is a perspective view of the vibration isolator with a part of the vibration isolator omitted.
Figure 5:
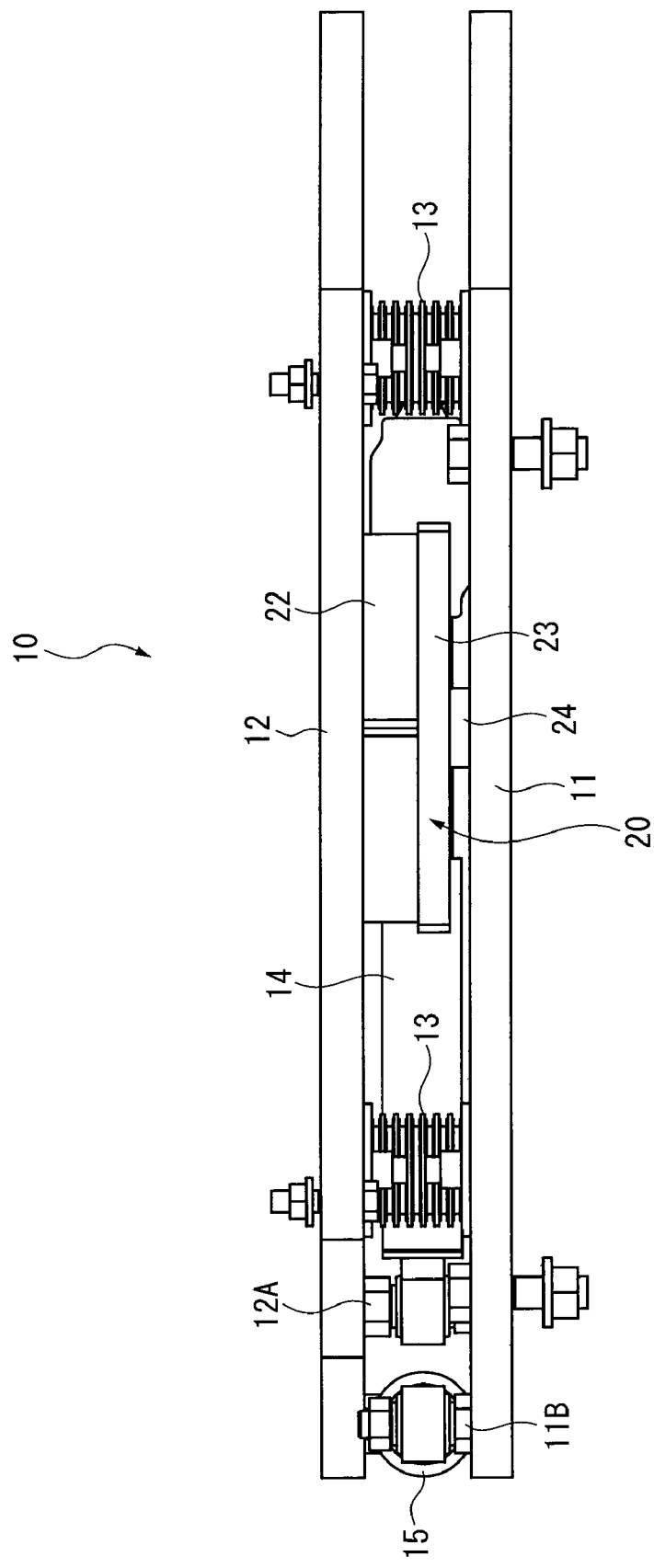
FIG. 5 is a side view of the vibration isolator.
Figure 6:
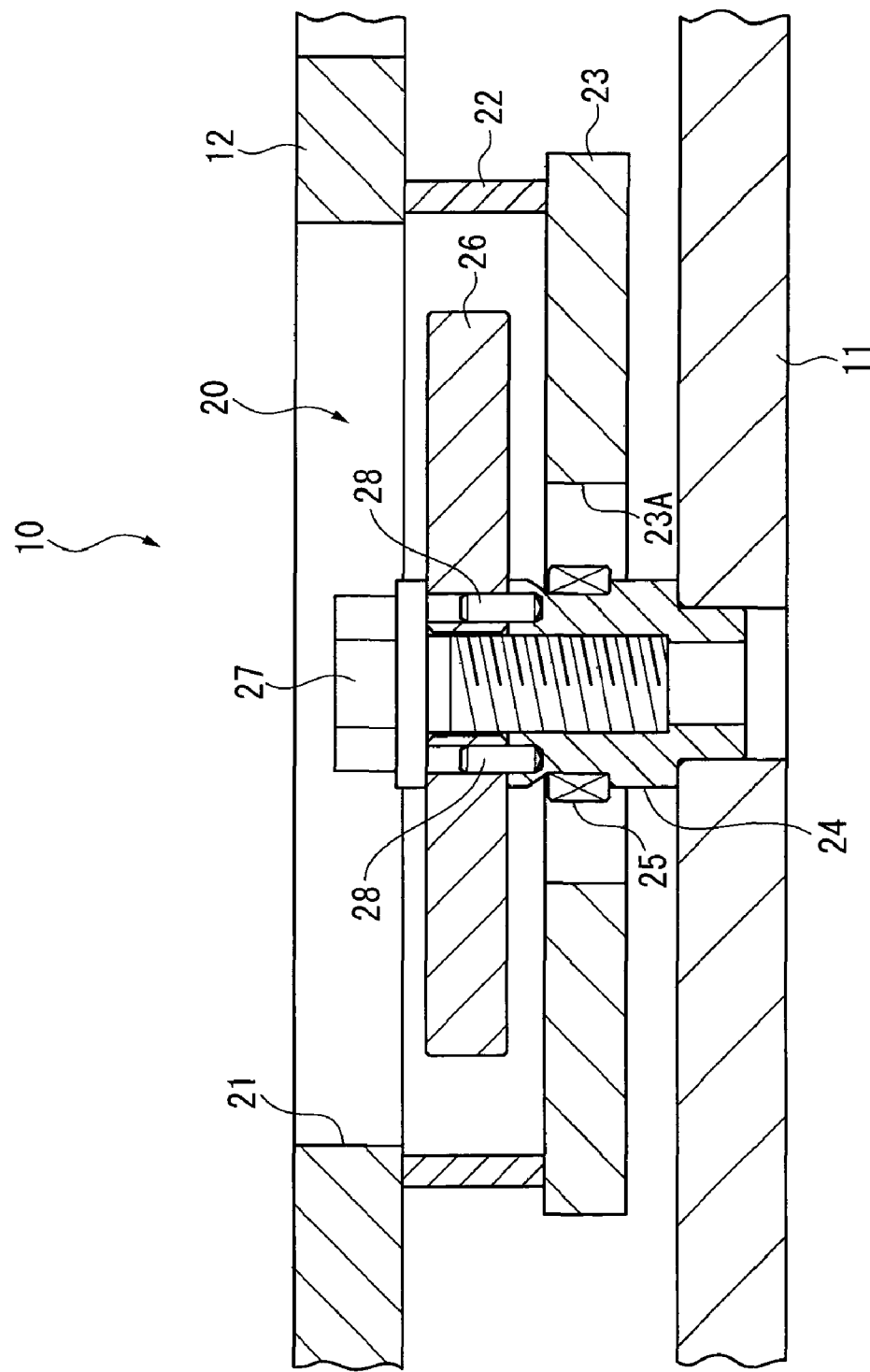
FIG. 6 is a sectional view that shows a primary portion of the vibration isolator.

FIG. 3 is an overall perspective view of the vibration isolator 10, while FIG. 4 is a perspective view of the vibration isolator 10 with a part thereof omitted. FIG. 5 is a side view of the vibration isolator 10, while FIG. 6 is a sectional view that shows a primary portion of the vibration isolator 10. In FIGS. 3 to 5, the vibration isolator 10 includes: a lower support plate 11 fixed to an upper side of the seat turntable 6 (see FIG. 2); and an upper support plate 12 fixed to a lower side of the seat suspension 2B; and layered rubbers 13 (elastic members) interposed between the support plates 11 and 12 at four corners.

Each of the support plates 11 and 12 has a flat panel shape. However, in order to reduce the weight of the panels, or in order for dampers 14 and 15 (which will be described later) or other parts to be easily mountable and adjustable, each of the support plates is shaped to have a plurality of openings as well as peripheral irregular portions.

The layered rubbers 13, which are structured by alternately layering a plurality of disc-shaped rubber materials and metal panels, have a columnar shape in its entirety. In such layered rubbers 13, the rubber materials are able to favorably absorb any anterior, posterior, left or right vibration. The metal panels are designed to improve rigidity, so that any weight upon the upper support plate 12 is able to be sufficiently supported.

Furthermore, a damper 14 is provided in a middle position between left and right layered rubbers 13 so that an axis of the damper is aligned in the anterior and posterior direction (the anterior and posterior direction as seen by an operator when seated). The damper 14 is an oil damper with oil enclosed in the interior of the damper, and has the same structure as a damper normally used as oil-enclosed shock absorber for providing the suspension.

Both ends of the damper 14 employ a rotatable mounting method such as a pillow ball-type rod end bearing or a rubber bush. One of the ends is attached to a mounting portion 11A provided on the lower support plate 11, while the other one of the ends is attached to a mounting portion 12A provided on the upper support plate 12.

On the other hand, anterior sides of the support plates 11 and 12 are linked by a similar damper 15 provided such that an axis of the damper is aligned in the left and right direction (the left and right direction as seen by an operator when seated). One of the ends of this damper 15 is attached to a mounting portion 11B on the lower support plate 11, while the other one of the ends is attached to a mounting portion 12B on the upper support plate 12. To give a detailed explanation of the position of the damper 15, the damper 15 is arranged to the further exterior of the anterior pair of layered rubbers 13.

Accordingly, the dampers 14 and 15 are arranged in the T shape when seen in plan view. By arranging the damper 14 to be aligned in the anterior and posterior direction and to pass through the middle, the movement in the anterior and posterior direction can be absorbed in a balanced manner and damped by the left and right layered rubbers 13. On the whole, the damper 15 on the anterior side can suppress movements in the left and right direction by applying a large damping force on the anterior layered rubbers 13. In addition, the softness of the layered rubbers 13 can be maintained by reducing a damping force applied on the posterior side.

In other words, the layered rubbers 13 at the posterior side of the seat body 2 are always ready to easily absorb shocks in the left and right direction. Thus, shocks in the left and right direction applied on the posterior of the main frame 3 can be favorably absorbed, so that an operator can have an increasingly comfortable ride. Furthermore, because the anterior side is damped earlier, various operation levers and the like arranged at the anterior can be operated without impediment, which also contributes to favorable maneuverability.

The vibration isolator 10 according to the exemplary embodiment is provided with a stopper mechanism 20 that limits a relative movement of the support plates 11 and 12. In FIGS. 3 and 6, apertures 21 are provided in left and right portions of the upper support plate 12. A side surface 22 is suspended from a bottom surface of the upper support plate 12 in a manner surrounding each aperture 21, and a lower region of the side surface 22 is closed by a stopper plate 23. Accordingly, a sunken space is formed by the side surface 22 and the stopper plate 23.

On the lower support plate 11, a column 24 is arranged vertically at a position corresponding to the aperture 21. An upper portion of the column 24 passes through a through hole 23A in the stopper plate 23, and enters an interior of the above-described space. An outer circumference of the column 24 is fitted into an annulated rubber member 25, and an outer circumference of this rubber member 25 faces an inner circumference of the stopper plate 23.

Accordingly, when a movement in a horizontal direction entails a large misalignment in the horizontal direction between the support plates 11 and 12, the column 24 and an interior surface of the stopper plate 23 collide together via the rubber member 25, and the movement is limited. According to the exemplary embodiment, in which the softness of the posterior layered rubbers 13 is particularly maintained, displacement in a horizontal direction at the posterior side of the support plates 11 and 12 will become large. However, by limiting such a horizontal movement, the posterior layered rubbers 13 are prevented from being greatly deformed in a shear direction, and their durability is enhanced.

Furthermore, on the upper portion of the column 24, a stopper plate 26 of rectangular shape when seen in plan view is arranged to be accommodated in the interior of the above-described space, and is fixed to the column 24 with a bolt 27. At this time, in order to prevent the stopper plate 26 from rotating, the column 24 and the stopper plate 26 are fixed via a pin 28, which stops the stopper plate 26 from rotating.

Accordingly, when large inclination (rolling or pitching) occurs between the support plates 11 and 12, or when the support plates 11 and 12 are vertically spaced away from each other greatly, the stopper plate 23 and the stopper plate 26 collide together to prevent the seat body 2 from being unnecessarily inclined or lifted up with respect to the main frame 3. The stopper mechanism 20 according to the aspect of the invention includes all of the components 21 to 28 described above.

Second Exemplary Embodiment

Figure 7:
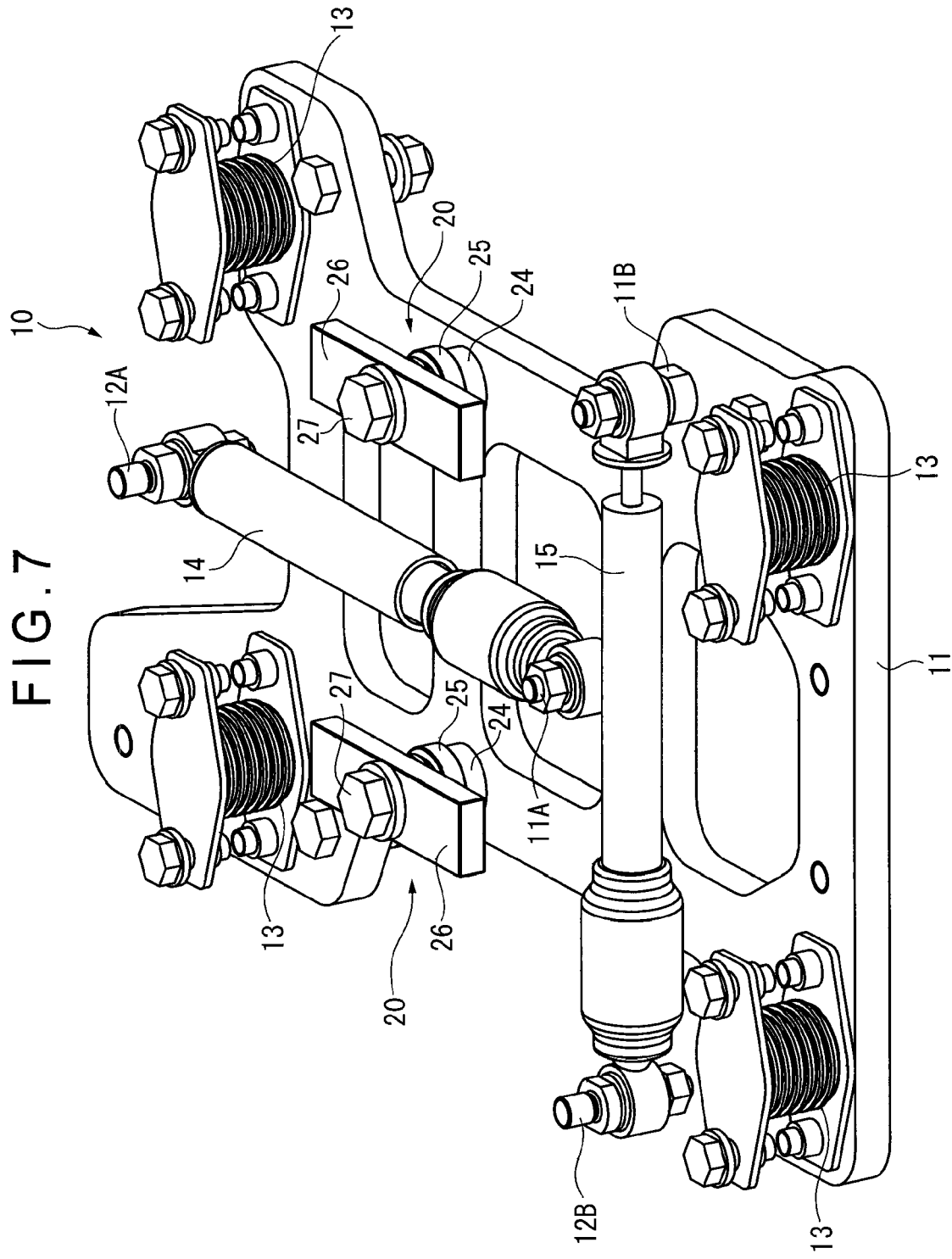
FIG. 7 is a perspective view that shows a vibration isolator according to a second exemplary embodiment of the invention.

FIG. 7 is a perspective view that shows a second exemplary embodiment. In the exemplary embodiment, the damper 15 aligned in the left and right direction is arranged on an inner side with respect to the anterior pair of layered rubbers 13. To be specific, this damper 15 is positioned closer to the anterior side than the middle between the anterior and posterior layered rubbers 13, and close to the anterior layered rubbers 13. The other configurations are essentially the same as those of the first exemplary embodiment described above although there is a difference in the specific shape of the lower support plate 11, the orientation of the damper 14 aligned in the anterior and posterior direction and the like.

Therefore, according to this exemplary embodiment as well, the dampers 14 and 15 are also arranged in the T-shape, and the damper 15 is positioned closer to the anterior side than the middle between the anterior and posterior layered rubbers 13. With such a configuration, it is possible to reduce a damping force applied on the posterior layered rubbers 13 and enhance shock absorbability at the posterior side. Thus, shock in the left and right direction applied on the posterior side can be favorably absorbed, so that an increasingly comfortable ride can be provided.

The invention is not limited to the exemplary embodiments, but includes other configurations or the like as long as an object of the invention can be achieved. The modifications described below are also included in the invention.

For example, according to the exemplary embodiments, the layered rubber 13 in which rubber materials and metal panels are alternately layered is used as the elastic body according to the aspect of the invention. However, the elastic body may optionally be formed from rubber material alone, or be a spring such as a coil spring. Furthermore, with respect to the number of elastic bodies, it is only required that at least three elastic bodies be used and spaced apart from one another in the anterior, posterior, left and right directions. Thus, four or more elastic bodies may be used.

According to the exemplary embodiments, the vibration isolator 10 is arranged between the cab floor 5 of the cab 4 and the seat body 2. However, the vibration isolator 10 may be arranged between a bottom surface of the cab floor 5 and a top surface of the main frame 3. In other words, the support body according to the aspect of the invention is the main frame 3, while the movable body according to the aspect of the invention is the cab 4, which includes the seat body 2 and the cab floor 5.

According to the exemplary embodiments, the vibration isolator 10 includes the stopper mechanism 20 that limits movement. However, the invention also includes a configuration where no stopper mechanism 20 is provided.

According to the exemplary embodiments, the vibration isolator 10 includes the support plates 11 and 12. However, for example, when the vibration isolator according to the aspect of the invention is arranged between the cab floor and the seat, the damper(s) and elastic body(ies) may be directly attached to the cab floor and the seat. In other words, the invention also includes a configuration where no support plate is provided.

The invention claimed is:

1. A vibration isolator, comprising:

elastic bodies interposed between a support body comprised in a construction machine and a movable body including a seat body for seating an operator; and a pair of dampers attached to the support body at first ends thereof and attached to the movable body at second ends thereof;

wherein the elastic bodies are arranged to be spaced apart in an anterior and posterior direction and in a left and right direction, with reference to a direction in which the operator faces when seated, the elastic bodies being movable in the anterior and posterior direction and in the left and right direction, wherein a first one of the dampers is arranged at a position corresponding to a middle of the left and right direction between the elastic bodies arranged in the left and right direction, the first one of the dampers being aligned in the anterior and posterior direction, and wherein a second one of the dampers is arranged only at a position closer to an anterior side than a middle of the anterior and posterior direction between the elastic bodies arranged in the anterior and posterior direction, the second one of the dampers being aligned in the left and right direction.

2. The vibration isolator according to claim 1, wherein the elastic bodies are interposed at at least three locations between the support body and the movable body.

3. The vibration isolator according to claim 1, wherein the elastic bodies are interposed at at least four locations between the support body and the movable body.

4. The vibration isolator according to claim 1, wherein the elastic bodies are layered rubbers in which rubber materials and metal panels are alternately layered.

5. The vibration isolator according to claim 1, wherein:

the support body comprises a cab floor provided to the construction machine, the movable body comprises the seat body arranged on the cab floor, and the vibration isolator is arranged between the seat body and the cab floor.

6. The vibration isolator according to claim 1, further comprising a stopper mechanism that limits a relative movement of the support body and the movable body.

* * * * *